(12) United States Patent  (10) Patent No.: US 9,152,937 B2
Ottavi et al.                (45) Date of Patent:     Oct. 6, 2015

(54) MESSAGE SEQUENCE MANAGEMENT OF ENTERPRISE BASED CORRELATED EVENTS

(75) Inventors: Adriano Ottavi, San Mariano (IT); Stefano R. Gandini, Cannes (FR); Luciano Aprile, Lecco (IT)

(73) Assignee: ACCENTURE GLOBAL SERVICES LIMITED, Dublin (IE)

(*) Notice: Subject to any disclaimer, the term of this patent is extended or adjusted under 35 U.S.C. 154(b) by 1104 days.

(21) Appl. No.: 11/901,308

(22) Filed: Sep. 17, 2007

(65) Prior Publication Data

US 2009/0048891 A1    Feb. 19, 2009

(30) Foreign Application Priority Data

Aug. 13, 2007 (EP) .................................... 07425528

(51) Int. Cl.
  *G06Q 10/00* (2012.01)
  *G06Q 10/06* (2012.01)
  *H04L 12/24* (2006.01)

(52) U.S. Cl.
  CPC ...... *G06Q 10/06316* (2013.01); *H04L 41/5054* (2013.01)

(58) Field of Classification Search
  CPC ......... H04L 63/10; H04L 47/70; H04L 47/00; H04L 47/10; H04L 47/50; G06Q 20/1235; G06Q 10/06316
  See application file for complete search history.

(56) References Cited

U.S. PATENT DOCUMENTS 5,579,384 A * 11/1996 Seymour ...................... 379/243
5,799,173 A *  8/1998 Gossler et al. ................. 703/21
2004/0117462 A1   6/2004 Bodin et al.
2005/0157865 A1 * 7/2005 Yeager et al. ............ 379/266.06
2007/0011281 A1 * 1/2007 Jhoney et al. .................. 709/220
2007/0118648 A1 * 5/2007 Millefiorini et al. .......... 709/225
2007/0174101 A1 * 7/2007 Li et al. ............................. 705/8
2007/0174185 A1 * 7/2007 McGoveran .................... 705/39
2008/0183926 A1 * 7/2008 Wingard et al. .............. 710/105
2008/0228977 A1 * 9/2008 Dignum et al. ............... 710/240

FOREIGN PATENT DOCUMENTS

EP    1 683 251 A1    3/2006
EP    1 780 981 A1    3/2007
EP    2 182 675 A1    5/2010

OTHER PUBLICATIONS

Communication from the European Patent Office for EPO Application No. 09016121.7 dated Apr. 8, 2010.
Examiner's First Report from the Australian Patent Office for Australian Application No. 2008203816 dated Mar. 8, 2011.
Notification of the First Office Action from the State Intellectual Property Office of the People's Republic of China for Chinese Patent Application No. 200810144953.X dated Jan. 11, 2012.
Examination Report dated Aug. 30, 2013 for corresponding Australian Application No. 2013203565, 3 pages.

* cited by examiner

*Primary Examiner* — William Brockington, III
(74) *Attorney, Agent, or Firm* — Brinks Gilson & Lione

(57) ABSTRACT

A message sequence management of enterprise based correlated events incorporates the changing and unique business of a telecommunications service provider with minimal configurations. The design identifies and manages related service requests and ensures that related service requests follow a precise execution sequence as defined by the business logic. The design's robust features allows for simplified integration and management to changing business processes and needs.

22 Claims, 7 Drawing Sheets

MESSAGE SEQUENCE MANAGEMENT OF ENTERPRISE BASED CORRELATED EVENTS

BACKGROUND

1. Priority Claim

This application claims the benefit of EPO Application No. 07425528.2 with the filing date of Aug. 13, 2007, which is incorporated herein by reference in its entirety.

2. Technical Field

This disclosure relates generally to identifying and managing service requests. More specifically, the disclosure concerns managing service request related messages across an enterprise of multiple applications.

3. Background Information

The communications industry continues to face demands for more services, and rapid deployment of new services, while the complexity of the underlying technologies providing the services continues to increase. Service providers require systems that provide both residential and commercial consumers the ability to easily activate and manage requests for services. Telecommunications service providers recognize the ability of consumers to choose desired services and take at least basic steps to order the services as a critical market differentiator. Consumers assess service providers based on the number of available services and the ease of activation and use of the services by consumers. Consumers also recognize the cycle-time between initiating a request for a service and successful service activation as a dominant market differentiator.

Provisioning telecommunication services involves many complex and technical details, and often spans multiple applications and systems resting on various technical platforms and several geographic locations. For any given service request, there may be multiple such systems that need to be accessed, utilized, and updated. These systems may be completely unrelated to each other. For example, a billing system is likely distinct from an order processing system. Additionally, an enterprise may have multiple billings systems at multiple geographic locations. Furthermore, the precise sequence of accessing, utilizing, and updating such systems is essential to the successful execution of a given service request. Additionally, the handling of several service requests at once, both related and unrelated, may clog network resources and result in errors if the requests are not handled properly, causing significant human intervention. The need for human interaction can significantly increase the cost associated for providing consumers with a level of acceptable customer service. Furthermore, if the required precise execution sequence of events is not properly handled, it can result in lost profits for the telecommunications service provider and a lack of trust by frustrated consumers towards the telecommunications service provider. For example, if an error occurs while a consumer is interacting with a telecommunication service provider, the consumer may halt the process and choose another telecommunications service provider.

Currently, in order for a telecommunications service provider to create a framework of processing service requests across multiple distinct applications and geographical locations, the telecommunications service provider implements a series of software applications geared towards their unique business. This can take an extraordinary amount of time and be very costly to the service provider. Furthermore, with all of the available software tools on the market, telecommunications service providers use various software tools on multiple different platforms. The telecommunications service provider's information technology may also be more comfortable using one set of tools versus another. For example, one information technology team may be better trained in UNIX and software that runs in a UNIX environment while another information technology team be more comfortable with Microsoft and Microsoft based products.

SUMMARY

By way of introduction, the embodiments described below include systems and methods for synchronizing data through a flow of multiple messages that require a precise execution sequence.

In a first aspect, a method for handling interdependent messages is disclosed. Generally, a service request is received by a telecommunications service provider. The telecommunications service provider assigns a correlation id to the service request and creates a new instance for the service request with the correlation id related information within the instance.

The telecommunications service provider determines if there is already a running instance with the same correlation id. If an instance with the same correlation id is already running, the telecommunications service provider adds an additional element related to the new Service Request to the current instance. The additional element instructs the current instance to withhold execution of the service request until the current instance receives a notification from the running instance.

In a second aspect, an alternative method for handling interdependent messages is disclosed. The telecommunications service provider receives a service request and assigns a correlation id to the service request. Next, the telecommunications service provider creates an instance for the service request if it is determined that a running instance with the same correlation id does not exist. If it is determined there is a running instance with the same correlation id, the new service request be added to a queue for processing.

In a third aspect, a method for managing a sequence of correlated service requests is disclosed. All of the possible service requests and their respective interdependencies are determined. Based on this determination, an execution sequence is assigned.

In a fourth aspect, a system for managing correlated events is disclosed. The system includes several different components including a software tool used to model the content of a service request, an integration middleware technology used to identify and configure correlated events and to support message based integration such as message-oriented middleware (MOM), enterprise service bus (ESB), Business Process Management (BPM) or enterprise application integration (EAI) and an external application component which includes business logic unique to the telecommunications service provider. The software tool monitors the content and the attributes of the service request and is used to prove the parameters among which the correlation criteria can be determined. The integration middleware technology is configured to handle service requests generated by an external service consumer. The external service consumer or application process logic invokes the service request under a specific sequence. The external service consumer is generally an application that is able to invoke the services according a specific logic or sequence in compliance with the steps needed to complete the business process of telecommunication service providers.

BRIEF DESCRIPTION OF THE DRAWINGS

The disclosure can be better understood with reference to the following drawings and description. The components in the figures are not necessarily to scale, emphasis instead being placed upon illustrating the principles of the design. Moreover, in the figures, like referenced numerals designate corresponding parts or elements throughout the different views.

Figure 1:
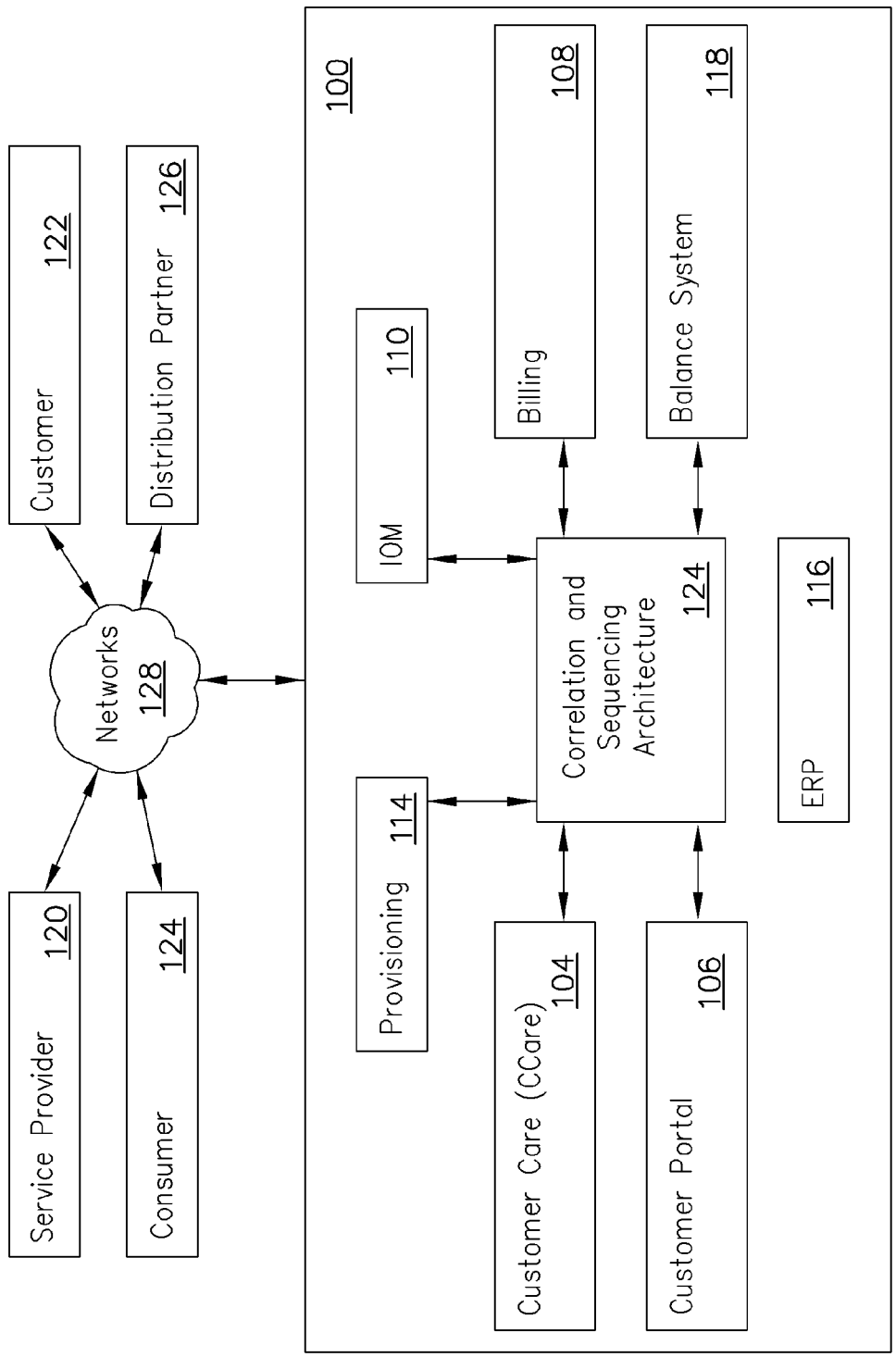
FIG. 1 is a simplified view of one embodiment of an operating environment.

Other systems, methods, features and advantages be, or become, apparent to one with skill in the art upon examination of the following figures and detailed description. It is intended that all such additional systems, methods, features and advantages be included within this description, be within the scope of the design, and be protected by the following claims.

DETAILED DESCRIPTION

A need currently exists for a standard application that can incorporate the unique business needs of any telecommunications service provider with minimal configurations. Furthermore, there is a need for a system that is able to run on multiple platforms and is vendor independent.

The Message Sequence Management of Enterprise Based Correlated Events design for a telecommunications service provider decouples the complexity of provisioning telecommunication services from the consumer experience. The design identifies and manages related service requests and ensures that related service requests follow a precise execution sequence as defined by the business logic. Additionally, related service requests operate in a single thread while unrelated service requests operate in a multiple threads.

Within the Message Sequence Management of Enterprise Based Correlated Events, the design may process service requests broken into a fine level of granularity that promotes the efficient implementation, reuse, and optimization of not only the service requests, but more complicated services built with the granular service requests. Examples of the granular services requests are given in more detail below. For example, the service requests may include a customer create service request, customer modify general date service request, and service order provisioning service request. The Message Sequence Management of Enterprise Based Correlated Events system may receive service requests and identify attributes (e.g., customer code, account code, partition code, organization code, product code, and an order id) of the service requests that define correlation codes. Correlation codes may be used to manage related service requests and exceptions in a coordinated fashion.

The design may uniquely define operational events (e.g., actions) that are mapped to business services (e.g., service requests directed to a service). The design may use business services to exchange information between systems involved in the delivery and management of services. In one implementation, the design implements a data model schema that defines entities used to create, read, update and delete service requests. Entities may represent discrete objects within the architecture used to offer consumers services and manage the delivery of services to customers. As examples, the architecture may include entities such as a billing account entity, customer entity, and organization entity. Entities may include attributes that uniquely identify service requests and define correlation codes. The architecture may use correlation codes to identify and manage related service requests in an orchestrated manner. For example, the design may use correlation codes to implement exception handling functionality.

Although specific components of a system are described, methods, systems, and articles of manufacture consistent with the architecture may include additional or different components.

FIG. 1 illustrates a simplified view of environment 100. The environment 100 may include some or all of a correlation and sequencing architecture 102, a CCare (Customer Care) system 104, a customer portal system 106, a billing system 108, an integrated order management system (IOM) 110, a provisioning system 114, an enterprise resource planning (ERP) system 116, and a balance system 118 (e.g., account management system). Furthermore, additional systems may also be included. For example, an enterprise may have multiple billing systems. The environment 100 may allow service providers 120 to communicate with customers 122, consumers 124 (e.g., potential customers), distribution partners 126 and other entities through a network 128 (e.g., the Internet).

The Correlation and Sequencing Architecture system 102 may mediate between the systems included in the environment 100 and in communication with the environment 100. The Correlation and Sequencing Architecture system 102 may permit applications to execute cohesively to carry out a number of logical cross-functional business processes. The Correlation and Sequencing Architecture system 102 may provide messaging services so that different applications can communicate together using service requests (e.g., business service requests).

Table 1 shows a sample list of business services the environment 100 may use to deliver and manage provisioned services. This list is only exemplary in nature and should not be used to limit the possible business services. The environment 100 may uniquely define operational events (e.g., actions) that the environment 100 maps to business services. The environment 100 may use business services to exchange information (e.g., data included in entities forwarded in service requests) between systems involved in the delivery and management of services (e.g., the Correlation and Sequencing system 102, the CCare system 104, the customer portal system 106, the billing system 108, IOM system 110, and the provisioning system 114, and the ERP system 116).

TABLE 1

| Business Services |
| --- |
| Account Invoice Inquiry |
| Activation |
| Adjustment Post-Paid Account |
| Bank Account Check |
| Create Alerts |
| Create Billing Account |
| Create Customer |
| Create Service Account |
| Create Post-Paid Order |
| Create Pre-Paid Order |
| Create Service Request |
| Create User |
| Credit Balance Inquiry |
| Modify Billing Account |
| Modify Customer Data |

TABLE 1-continued

Business Services

Modify Service Request
Modify User
Number Portability Request
Refill
Request SIM Card Replacement
Retrieve Billing Account Data
Retrieve Customer Data
Retrieve Installed Assets
Retrieve Orders
Retrieve Product Configuration
Retrieve Product List
Retrieve Product Price
Retrieve Service Accounts
Retrieve Service Request
Retrieve User Data
Send e-Mail message
Send SMS message
Service Item for Provisioning Response
Service Order for Provisioning
Service Order for Provisioning Response
Synchronize Account Billing Profile
Synchronize Account Bill to Address
Synchronize Account Bill to Person
Synchronize Account General Data
Synchronize Account Payment Data
Synchronize Account
Synchronize Asset Component
Synchronize Customer
Synchronize Customer Fiscal Address
Synchronize Customer General Data
Task Execute
Task Execute Response
Traffic Usage Inquiry
Validate Credit Card Data
Validate Customer Address
Validate Customer Data
Validate DSL availability

TABLE 3

Business Services (Entities) Combinations

Adjustment Post-Paid Account (Billing Account, Billing Adjustment, Product-Service)
Adjustment Pre-Paid Account (Billing Account, Billing Adjustment, Product-Service)
Asset Component (Attribute(s), Product-Service)
Create Account (Billing Account, Address, Organization, Billing Profile, Payment Data, Contact)
Create Customer (Customer, Address, Organization)
Modify Account Bill to Address (Address, Billing Account, Organization)
Modify Account Bill to Person (Billing Account, Contact, Organization)
Modify Account Billing Profile (Billing Account, Billing Profile, Organization)
Modify Account General Data (Billing Account, Organization)
Modify Account Payment Data (Billing Account, Billing Profile, Organization, Payment Data)
Modify Customer General Data (Customer, Organization)
Modify Customer Physical Address (Address)
Refill (Billing Account, Billing Profile, Payment Data, Product-Service, Refill)
Service Order for Provisioning (Service Order, Product-Service(s), Product-Service-Account, Product-Service-Account-Address(s), Product-Service-Account-Contact(s), Product-Service-Attribute(s), Product-Service-User-Contact(s))
Task Execute (Technical Service Order, Order, Attribute(s))
Task Execute Response (Technical Service Order, Attribute(s))

Figure 6:
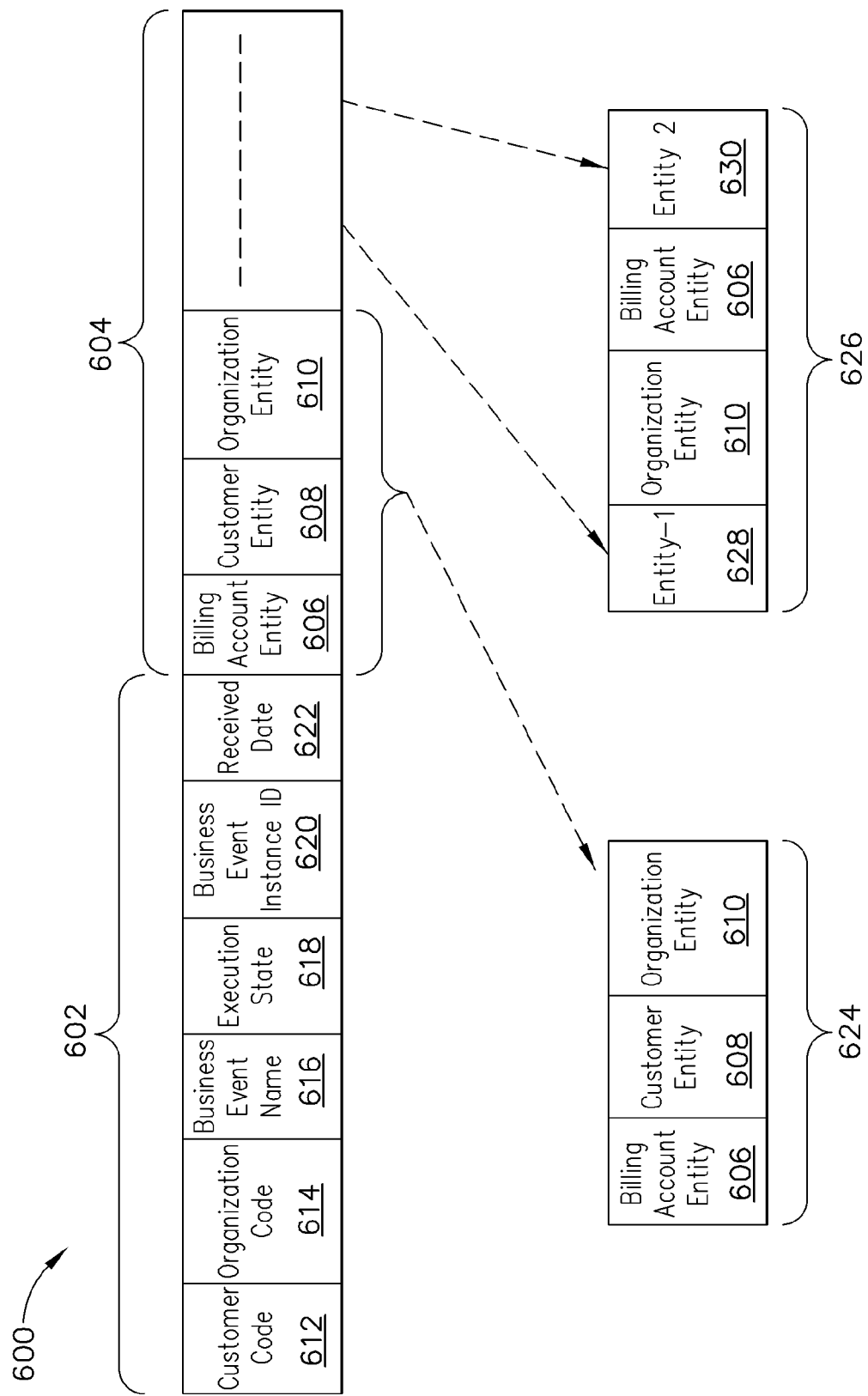
FIG. 6 illustrates the construction of correlation codes.

Referring briefly to FIG. 6, each business service 600 may include a header 602 and objects 604 that represent logical entities such as a billing account entity 606, a customer entity 608, and an organization entity 610. The header 602 of the business services may include attributes such as a customer code 612 to identify a customer, an organization code 614, a business event name 616, an execution state 618 to indicate status, a business event instance id 620 to identify multiple instances and threads of a business event, and a received date 622 to time stamp when a system receives a business service. The environment 100 may consult a correlation code definition or other correlation code specification to determine which attributes the environment 100 uses, and in what order, to form a correlation code. For example, the architecture may obtain a correlation code 624 by concatenating the ordered sequence of billing account entity 606, customer entity 608, and organization entity 610 into a single correlation code 624. In another example, the environment 100 may obtain a correlation code 626 by combining entities from a business service 600 in a different order or sequence.

Table 3 shows example business services and entity combinations that the environment 100 may use to deliver and manage provisioned services. For example, the create customer business service may include the header, and the entities customer, address, and organization, while the modify customer general data business service may include the header and the entities customer and organization.

The environment 100 may use business events (e.g., business service requests) to exchange data between the systems within and in communication with environment 100. For example, IOM system 110 may request a provisioning system 114 to perform a particular operation that results in a task execute event. In one implementation, the correlation and sequencing system 102 receives a request from the IOM system 110 and forwards the request to the appropriate provisioning system 114. The task execute event may be represented by a task execute business service that contains service requests that the IOM system 110 maps to system operations tasks.

The CCare system 104 may manage customer relationships so that service providers 120 and customers 122 can access customer information directly, match customer needs with product service plans and offerings, remind customers of service requirements, and identify all the products purchased and/or in use by a customer 122. The CCare system 104 may include capabilities to help the marketing department of the service provider 120 to identify and target the best customers of the service provider 120, manage marketing campaigns with clear goals and objectives, and generate quality leads for the sales team of the service provider 120. The CCare system 104 may assist the service provider 120 to improve telesales, account, and sales management by optimizing information shared by multiple employees, and streamlining existing processes (e.g., taking orders using mobile devices). The CCare system 104 may provide the service provider 120 with functionality to form customized relationships with the customers 122, consumers 124 (e.g., potential customers) and distribution partners 126. The CCare system 104 may improve customer satisfaction, identify the most profitable customers, provide customers with the highest level of service, and consequently, maximize profits. The CCare system 104 may provide the employees of the service provider 120 with the information and processes necessary to analyze customer profiles, understand the needs of the customer 122, and effectively build relationships between the service provider 120, the customer 124 and the distribution partners 126.

The customer portal 106 may allow customers 122 and consumers 124 to access and provision services directly from a network (e.g., the Internet). In one implementation, the customer portal 106 communicates with the correlation and sequencing system 102 through Simple Object Access Protocol (SOAP) which provides an approach to exchanging XML-based messages. The customer portal 106 may provide customers 122 and consumers 124 a browser to view, purchase and provision available services, modify demographic information, billing account and payment data, view an invoice statement, balance, and refill pre-paid accounts.

The billing system 108 may perform the activity of invoicing customers 122 for products and services. The main functions of the billing system 108 may include maintaining billing data, recurrent and usage charges for services, discounts, service rates, catalogue of services, and generating printed and electronic bills.

The integrated order management (IOM) system 110 may provide the environment 100 a foundation for process automation, as well as the human workflow components used to provision a service. The IOM system 110 design may implement service order and task level management used to successfully provision a service.

The provisioning system 114 may provide services to set up a service including configuring equipment, wiring, and transmission. The provisioning system 114 may manage the functionality to activate and deactivate products and services offered by a service provider 120. The provisioning system 114 may manage wireless and wireline provisioning, internet protocol television (IPTV), voice over internet protocol (VOIP), and dedicated services provisioning.

The ERP (Enterprise Resource Planning) system 116 may manage product planning, purchasing (e.g., materials and components used to deliver products and services), maintaining inventories, interacting with suppliers, providing customer service, and tracking orders. The ERP system 116 may also include application modules to manage the finance and human resources aspects of the service provider business. The ERP system 116 may manage and track the collection of the payments by customers 122 of invoices sent by the billing system 108, record the payments, and match orders and payments to distribution partners 126 (e.g., suppliers).

In one implementation, the CCare system 104 manages all the entities related to customer and account management and the orders for products and service purchased by customers 122. The CCare system 104 may initiate the operations devoted to activate, modify and remove customer data and order activation and deactivation. The correlation and sequencing system 102 may replicate and forward entities as needed to the systems in communication with the environment 100 to provision and manage services. The correlation and sequencing system 102 may map the CCare system 104 event to a corresponding business service. The environment 100 may transform data forwarded to business services into a common object model used by the systems in communication with the environment 100 to provision and manage services. The correlation and sequencing system 102 may provide logic to route events (e.g. service requests to business services) to applications using a predetermined sequence. The correlation and sequencing system 102 may provide consumers 124 and customers 122 a portal (e.g., the customer portal system 106) that provides a set of invokable services. In one implementation, the customer portal system 106 forwards service requests to the correlation and sequencing system 102 that the correlation and sequencing forwards to CCare system 104 to provision and manage services.

Figure 2:
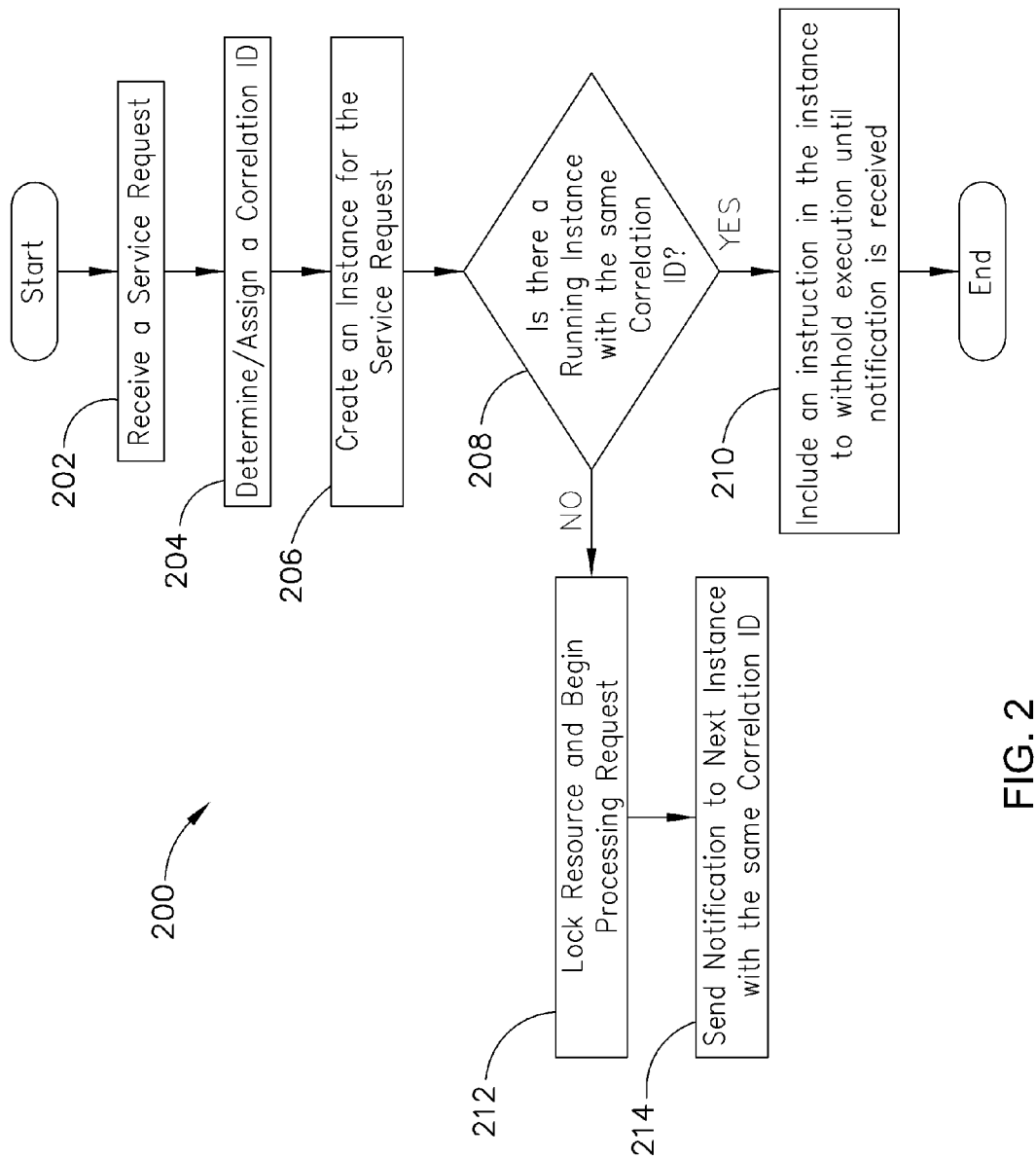
FIG. 2 is a flowchart illustrating processing of a service request.

FIG. 2 is a simplified flowchart illustrating the steps undertaken when a new service request enters the system. A service request is received at block 202. At block 204, the correlation id is determined. In one implementation, the correlation id is assigned in this step. At block 206, the implementation creates an instance for the service request. Next, at block 208, it is determined whether there is already a running instance with the same correlation id. If it is determined that a running instance with the same correlation id exists, an instruction is added to the instance to await execution until a notification is received at block 210. Unlike prior art systems that continuously poll the network to determine a status and ultimately clog network resources, the current instance move to a sleep state and wait for a notification to be received. A fail-over mechanism may be placed within the current instance at block 210 to 'wake up' every so often and query the queue or the repository where the instances which are in a sleep state are running. For example, a waiting time of 20 minutes may be coded within the current instance. After the current instance has been in a 'sleep' mode for 20 minutes, a process in the integration middleware may wake up and check if there are running instances with the same correlation ID. Depending on the response received, a decision is made on how to proceed For example, the instance may return to a sleep mode for another 20 minutes or may execute.

If, at block 208, it is determined that no other instance with the same correlation id as the current instance is running, the system locks the resource needed by the current instance and begin processing the request. Once the instance has completed processing, the resource being used is unlocked and a notification is sent to the next instance with the same correlation id at block 214. The notification instructs the next instance to begin processing.

Figure 3:
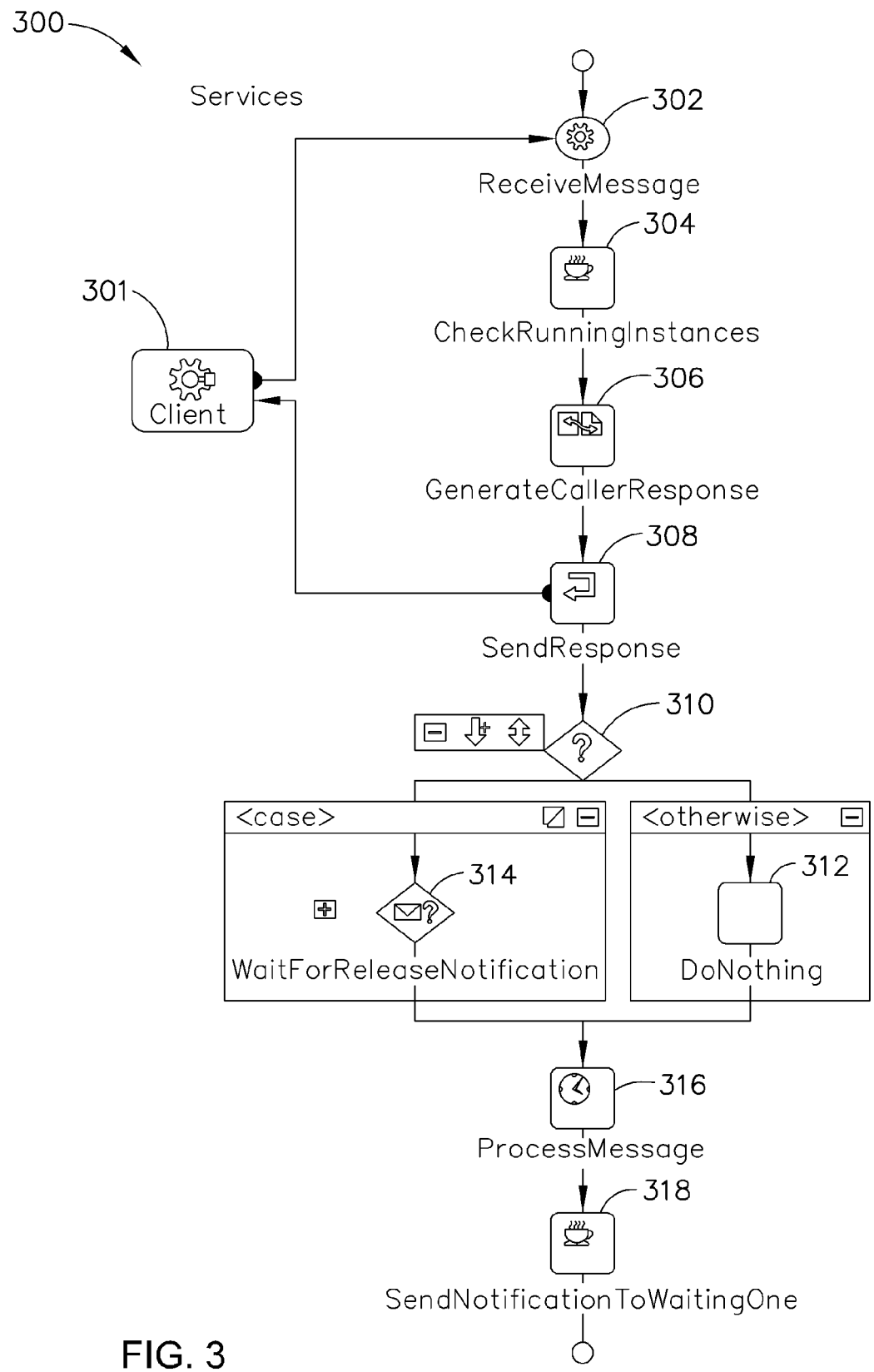
FIG. 3 is a detailed diagram of one possible implementation of the processes involved for the correlation and sequencing architecture.

FIG. 3 is a detailed diagram is a snapshot of one implementation of the processes involved for the correlation and sequencing architecture using BPEL technology. In this example, the Oracle BPEL software package was used as the software platform to build a solution. However, other platforms may also be used. FIG. 3 demonstrates the process of receiving a message (i.e. a service request) and checking if a running instance exists for the associated correlation ID. A telecommunications client 301 fills out a request for service. The service request is received at 302. At 304, the system checks for running instances with the same correlation id as the current service request. This can be done through a "CheckRunningInstances" procedure written in Java. The "CheckRunningInstance" uses the BPEL API "lookupinstances." The "lookupinstances" API checks for all running instances with the same correlation id (for example, a customer code) and determines which instance needs to finish processing before the current instance can run. The "CheckRunningInstances" also sets the correlation id (ex. customer code) in the current instance to ensure that other instances be able to find the current instance if a search is initiated. At 406, a response to be sent to the client is generated. This response may be an XLM message. Next, at 408, a response is sent to the client indicating a "request was successful" message or a similar message. The process/service request has not completed, but this is transparent to the client. Thus, the client does not have to wait for all of the telecommunications service provider's internal processing to be completed.

Depending on whether or not a running instance with the same correlation id was found in step 304, a decision is made in step 310. If a running instance with the same correlation id was not found in step 304, the instance proceeds to step 312. No additional instructions are added to the instance. At step 316, the instance processes the message. Once processing is complete, the instance unlocks the resource and sends a notification in step 318 to the next waiting instance to begin processing. If a running instance with the same correlation id as the current instance was found in step 304, a property is added to the instance at step 314 to withhold execution until a notification is received from the running instance. Once the notification is received, the current instance proceeds to step 316 and process the message. Once processing is complete, the instance unlocks the resource and sends a notification in step 318 to the next waiting instance to begin processing.

Figure 4:
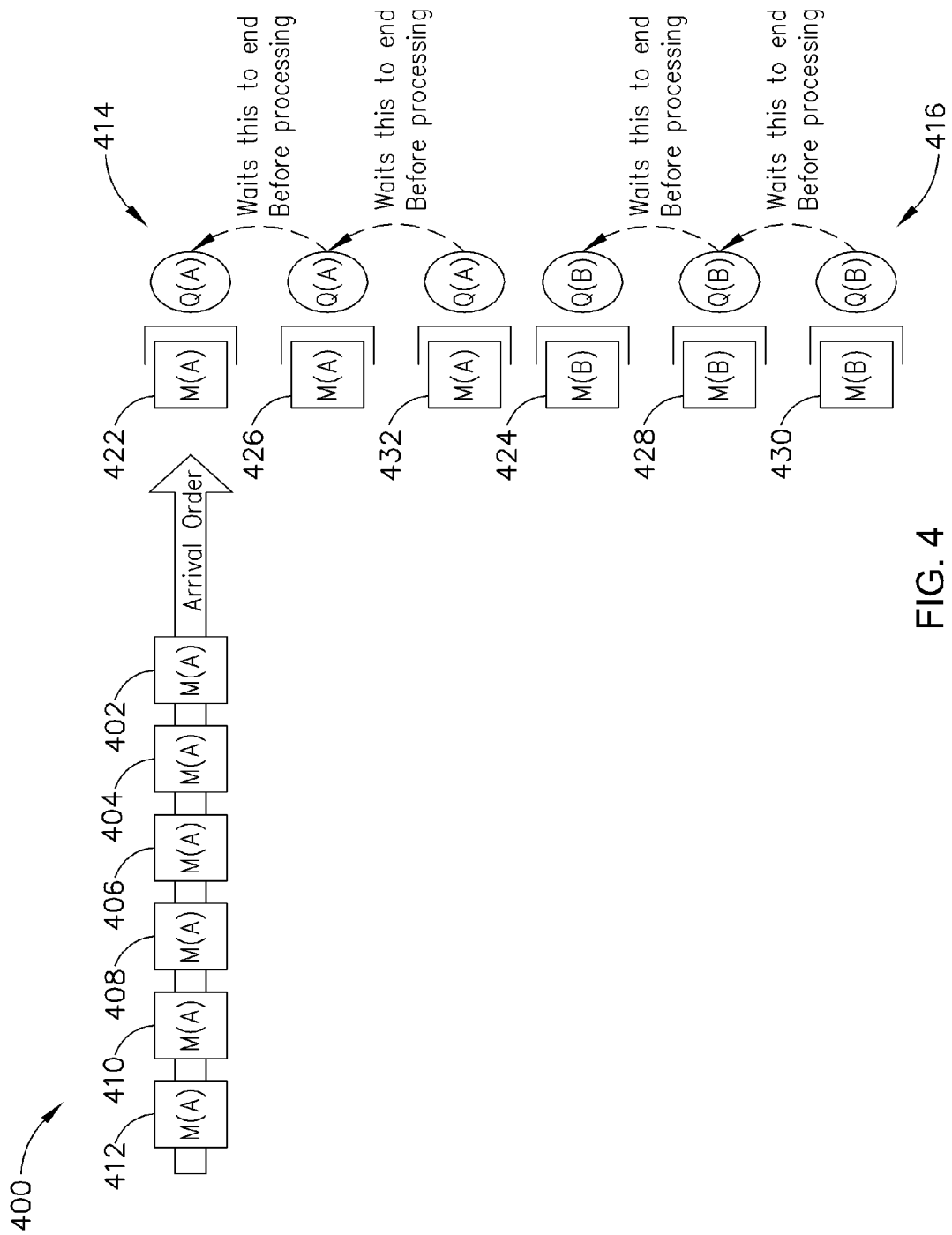
FIG. 4 is a simplified view illustrating a an example of the current design.

FIG. 4 is a simplified view illustrating an example of the current design. M(X) represents a message with a Correlation ID of X. Q(X) represents the messages waiting in a queue that have a Correlation ID of X. For example, suppose messages 402, 404, 406, 408, 410, and 412 arrived in the stated order. 402, 406, and 412 all have a correlation id of A and therefore, these messages are related. 404, 408, and 410 all have a correlation id of B and therefore, these messages are related. In this example, correlation id A and correlation id B have no relationship with each other. Correlation ID's A and B can relate to a number of variables. For example, the correlation id can be a unique identifier for a client such as a customer code. The system creates an instance for each message received. For message 402, instance 422 is created. For message 404, instance 424 is created. For message 406, instance 426 is created. For message 408, instance 428 is created. For message 410, instance 430 is created. For message 412, instance 432 is created. All instances with the same correlation id enter a queue for further processing that is directly related the correlation id. Thus, instances 422, 426, and 432 enter Q (A) 414 while instances 424, 428, and 430 enter Q (B) 416. Q(A) and Q(B) have no relationship with each other and can run simultaneously. The instances for Q (A), 422, 426, and 432 process in the same order the messages were received. Thus, since message 402 was received before message 406, 406 do not begin processing until 402 has completed and message 412 waits in the queue (Q(A)) until message 406 has finished processing. Similarly, the instances for Q (B); 424, 428, and 430 process in the same order the messages were received. Thus, since message 404 was received before message 408, 408 does not being processing until 404 has completed and message 410 waits in the queue (Q(A)) until message 408 has finished processing. However, even though M(B) 408 entered the system after M(A) 406, it is possible for M(B) 408 to begin processing before M(A) because M(A) and M(B) do not have a relationship with each other and M(A) and M(B) 504 may have finished processing before M(A) 402. Similarly, messages with different correlation id's can run at the same time. For example, M(A) 408 and M(B) 406 can run simultaneously.

Figure 5:
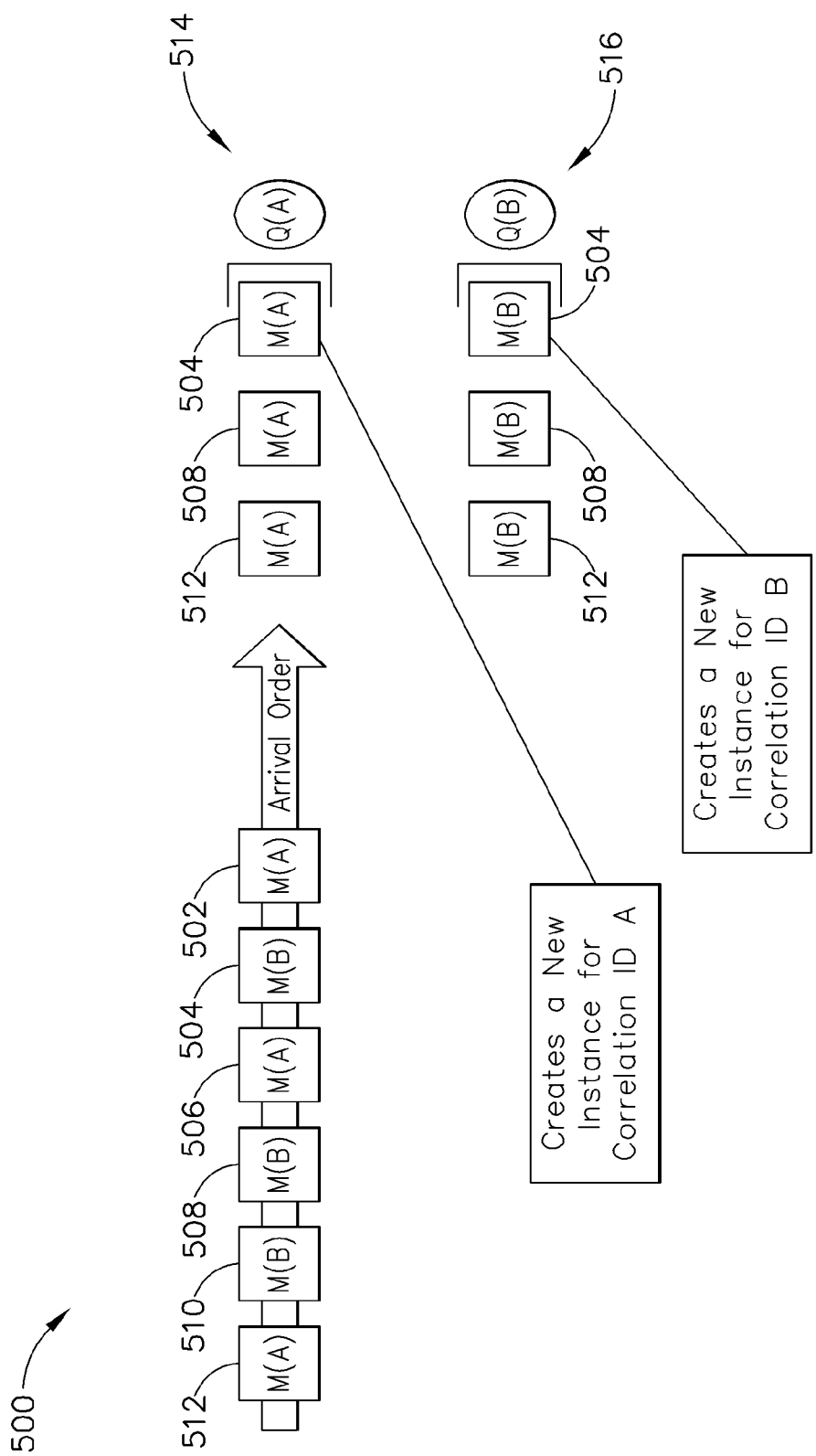
FIG. 5 is a simplified view illustrating an alternate example of the current design.

FIG. 5 is a simplified view illustrating an alternate example of the current design. M(X) represents a message with a Correlation ID of X. Q(X) represents messages waiting in a queue that have a Correlation ID of X. Similar to FIG. 5, suppose messages 502, 504, 506, 508, 510, and 512 arrived in the stated order. 502, 506, and 512 all have a correlation id of A and therefore, these messages are related. 504, 508, and 510 all have a correlation id of B and therefore, these messages are related. Once again, correlation id A and correlation id B have no relationship with each other. In FIG. 5, an instance is not created for each message received. Rather, the first message received with a given correlation id creates an instance. Here, M (A) 502 creates an instance for Q (A) 514 and M (B) 504 creates an instance for Q (B) 516. All of the messages in Q (A) 514 thus run within the same instance created by M (A) 502. Similarly, all of the messages in Q (B) 516 run with the same instance created by M (B) 504. All of the messages with the same correlation id enter a queue for further processing that is directly related the correlation id. Thus, messages 502, 506, and 512 enter Q (A) 614 while instances 504, 508, and 512 enter Q (B) 516. Q(A) and Q(B) have no relationship with each other and can run simultaneously. The messages in Q (A), 502, 506, and 512 process in the same order the messages were received. Thus, since message 502 was received before message 506, 506 not begin processing until 502 has completed and message 512 waits in the queue (Q(A)) until message 506 has finished processing. Similarly, the messages for Q (B); 504, 508, and 512 process in the same order the messages were received. Thus, since message 504 was received before message 508, 508 are not being processing until 504 has completed and message 510 waits in the queue (Q(A)) until message 508 has finished processing. However, even though M(B) 508 entered the system after M(A) 506, it is possible for M(A) 508 to begin processing before M(A) because M(A) and M(B) do not have a relationship with each other and M(A) and M(B) 504 may have finished processing before M(A) 502. Similarly, messages with different correlation id's can run at the same time. For example, M(A) 508 and M(B) 506 can run simultaneously.

Figure 7:
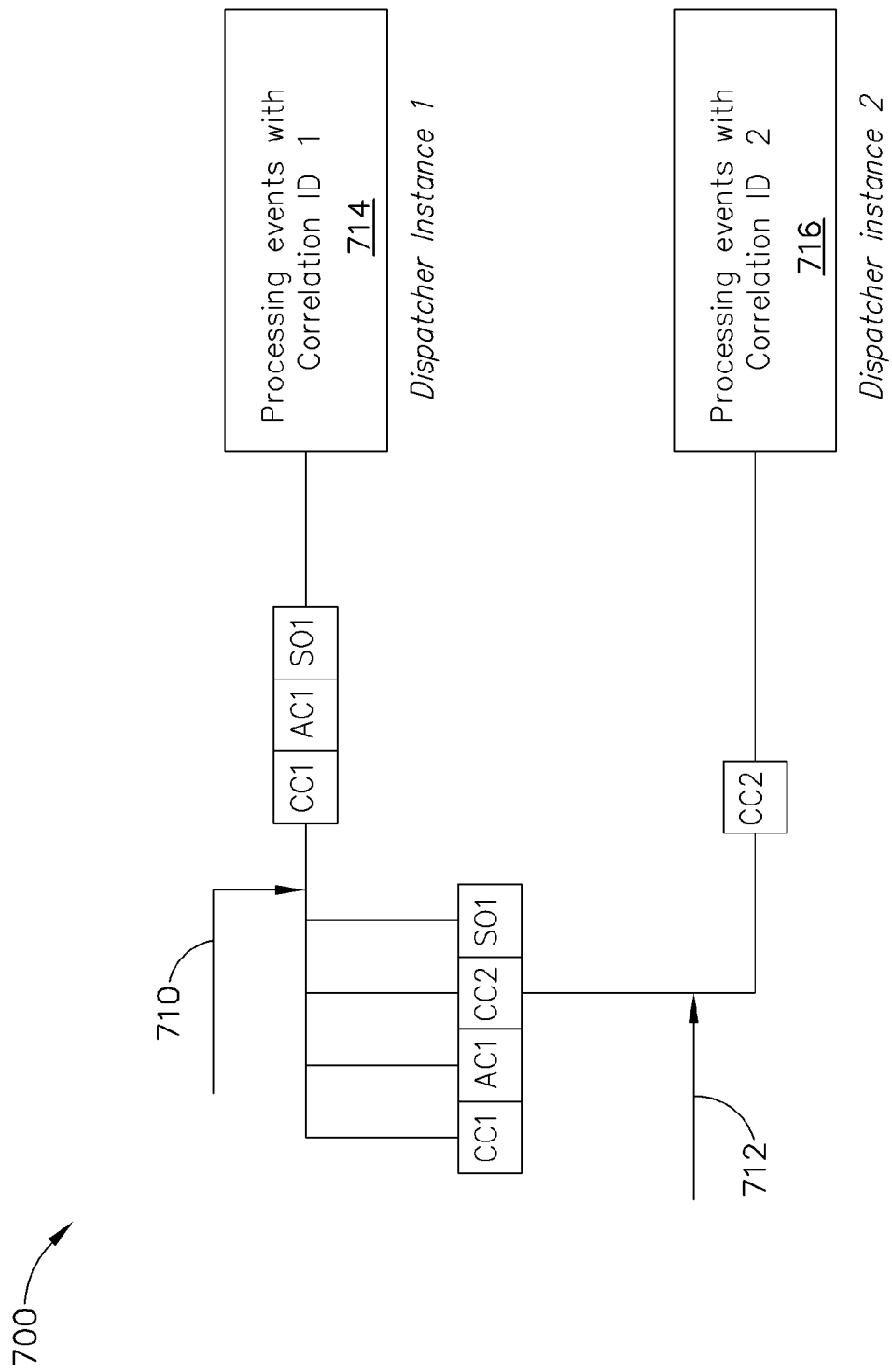
FIG. 7 outlines a simplified example of the current design.

FIG. 7 outlines a simplified example of the current design. In FIG. 7, four messages are sent to a BPEL process in a very short time frame. The BPEL engine is only an example of the technology that may be used and is referenced here to simplify the explanation. Other technologies may also be used for FIG. 7. These four messages are to create customer 1, create customer 2, create an account for customer 1 and a service order for customer 1. Referring to FIG. 7, create customer 1 is referenced by cc1, create customer 2 is referenced by cc2, create an account for customer 1 is referenced by AC1, and a service order for customer 1 is referenced by SO1. CC1, AC1, and S01 are for the same customer and therefore, they have the same Correlation ID of 1. CC2 is for a different customer and has a Correlation ID of 2. The three messages with a Correlation ID of 1 are queued to be possessed sequentially through a single thread 710. CC1 starts a new instance of the BPEL process 714, in this case the Dispatcher process for instance #1. The dispatcher process manages all of the messages for instance #1. Since CC2 is unrelated to CC1, AC1, and SO1, CC2 is processed simultaneously in a second thread 712. CC2 starts a new instance of the BPEL process 714, in this case the Dispatcher process for instance #2.

It is intended that the foregoing detailed description be understood as an illustration of selected forms that the invention can take and not as a definition of the invention. A number of implementations have been described. Nevertheless, it will be understood that various modifications may be made without departing from the spirit and scope of the invention. Accordingly, other implementations are within the scope of the following claims.

What is claimed is:

1. A method for message sequence management of correlated events comprising:
receiving, by a correlation and sequencing subsystem of a system, a service request from a sending subsystem of the system that defines a plurality of entities, each entity defines information that facilitates performance of a task by a target subsystem of the system that is associated with the entity;
combining, by the correlation and sequencing subsystem, information defined in at least two entities of the plurality of entities to thereby define a correlation ID associated with the service request;

creating a current instance for the service request, where the current instance is one of a plurality of running instances;

including the correlation ID in the current instance;

determining whether another running instance of the plurality of running instances includes a correlation ID identical to the correlation ID in the current instance and whether interdependencies exist between the service request, the another service request and different service requests, wherein the different service requests have corresponding different running instances of the plurality of running instances that include different correlation IDs from the correlation ID in the current instance;

adding an element to the current instance if the another running instance includes the correlation ID;

wherein the element added to the instance includes a service request instruction to the service request to withhold execution of the service request until a notification is received from the another running instance;

communicating, by the correlation and sequencing subsystem, service requests associated with a same correlation ID to one or more target subsystems associated with the service requests in a sequential manner so that a single service request of the service requests is processed by an associated target subsystem and finishes processing before a next service request with the same correlation ID is processed by a same or different target subsystem; and communicating, by the correlation and sequencing subsystem, service requests associated with different correlation IDs to one or more target subsystems associated with the service requests in parallel to facilitate parallel processing of the service requests by one or more target systems.

2. The method of claim 1, wherein the service request is selected from one of multiple reusable service requests, wherein the reusable service requests include a fine level of granularity that promotes the efficient implementation, reuse, and optimization of service requests.

3. The method of claim 2, wherein the reusable service requests include at least one of:
a customer create service request;
a customer modify general date service request;
a customer modify physical address service request;
a modify customer data service request;
an account modify general date service request;
an account modify billing profile service request;
an account modify bill to person service request;
an account modify bill to address service request; and
an account modify payment date service request.

4. The method of claim 2, wherein the reusable service requests include at least one of:
a service order provisioning service request;
an asset component service request;
a provisioning task service request; and
a task execute response service request.

5. The method of claim 1 further comprising:
sending a notification to a next received instance having the same correlation ID upon the termination of the current instance.

6. The method of claim 5 wherein the next received instance begins processing once the notification is received.

7. The method of claim 4 further comprising: locking a resource being used by the next received instance.

8. The method of claim 1 wherein the adding an element to the current instance if a running instance of the another running instance includes the correlation ID further comprises:

setting a time period for the current instance to determine the status of the another running instance such that after the time period is expired, checking if the another running instance with the correlation ID still exists.

9. The method of claim 1 further comprising:
receiving a second service request; and
determining and assigning a second correlation ID to the second received service request.

10. The method of claim 9 wherein the first instance having a first correlation ID and the second instance having a second correlation ID are processed simultaneously.

11. A method message sequence management of correlated events comprising:

receiving, by a correlation and sequencing subsystem of a system, a service request from a sending subsystem of the system that defines a plurality of entities, each entity defines information that facilitates performance of a task by a target subsystem of the system that is associated with the entity;

combining, by the correlation and sequencing subsystem, information defined in at least two entities of the plurality of entities to thereby define a correlation ID associated with the service request;

determining whether another running instance of a plurality of running instances includes the a correlation ID identical to the correlation ID in the current instance and whether interdependencies exist between the service request, the another service request and different service requests, wherein the different service requests have corresponding different running instances of the plurality of running instances that include different correlation IDs from the correlation ID;

adding the service request to a processing queue if the another running instances includes the correlation ID, and creating a current instance if the running instance of the plurality of running instances does not include the correlation ID;

wherein the processing queue includes all of the service requests received for the correlation ID in the order the service requests were received; and communicating, by the correlation and sequencing subsystem, service requests associated with a same correlation ID to one or more target subsystems associated with the service requests in a sequential manner so that a single service request of the service requests is processed by an associated target subsystem and finishes processing before a next service request with the same correlation ID is processed by a same or different target subsystem; and communicating, by the correlation and sequencing subsystem, service requests associated with different correlation IDs to one or more target subsystems associated with the service requests in parallel to facilitate parallel processing of the service requests by one or more target systems.

12. The method of claim 11 wherein the step of creating an instance if a running instance for the correlation ID does not exist further comprises:
creating a queue and adding the service request to the queue.

13. The method of claim 12, wherein the service request is selected from one of:
multiple reusable service requests, wherein the reusable service requests include a fine level of granularity that promotes the efficient implementation, reuse, and optimization of service requests.

14. The method of claim 13, wherein the service request includes at least one of:
- a customer create service request;
- a customer modify general date service request;
- a customer modify physical address service request;
- a modify customer data service request;
- an account modify general date service request;
- an account modify billing profile service request;
- an account modify bill to person service request;
- an account modify bill to address service request; and
- an account modify payment date service request.

15. The method of claim 13, wherein the service request includes at least from one of:
- a service order provisioning service request;
- an asset component service request;
- a provisioning task service request; and
- a task execute response service request.

16. The method of claim 12 further comprising receiving a second service request and determining and assigning a second correlation ID to the second received service request.

17. The method of claim 16 wherein the first instance having a first correlation ID and the second instance having a second correlation ID are processed simultaneously.

18. A method for managing a sequence of correlated service requests, the method comprising:
- determining, using instructions executed by a computing system connected to a network, a plurality of possible service requests used to deliver services, using the network, to users;
- configuring, using the instructions, interdependencies within the possible service requests to coordinate execution of a plurality of respective instances on the network for the possible service requests, wherein configuration of interdependencies comprises forming a correlation ID and associating the correlation ID with a request, wherein the service request defines a plurality of entities, each entity defines information that facilitates performance of a task by a target subsystem of the computing system that is associated with the entity, wherein information defined in at least two entities of the plurality of entities is combined to thereby define a correlation ID associated with the service request, wherein interdependent service requests have respective correlation IDs that match; and
- processing the plurality of respective instances based at least in part on the interdependencies, wherein the plurality of respective instances include a respective instance with a different correlation ID from an identical correlation ID for at least two of the plurality of respective instances;
- communicating service requests associated with a same correlation ID to one or more target subsystems associated with the service requests in a sequential manner so that a single service request of the service requests is processed by an associated target subsystem and finishes processing before a next service request with the same correlation ID is processed by a same or different target subsystem; and
- communicating service requests associated with different correlation IDs to one or more target subsystems associated with the service requests in parallel to facilitate parallel processing of the service requests by one or more target systems.

19. The method of claim 18, wherein the service request is selected from one of:
- multiple reusable service requests that use the network to deliver services to users, wherein the reusable service requests include a fine level of granularity that promotes the efficient implementation, reuse, and optimization of service requests.

20. The method of claim 19, wherein the reusable service requests include at least one of:
- a customer create service request;
- a customer modify general date service request;
- a customer modify physical address service request;
- a modify customer data service request;
- an account modify general date service request;
- an account modify billing profile service request; and
- an account modify bill to person service request.

21. The method of claim 19, wherein the reusable service requests include at least one of:
- an account modify bill to address service request; an account modify payment date service request; a service order provisioning service request;
- an asset component service request;
- a provisioning task service request; and
- a task execute response service request.

22. A system for managing correlated events, the system comprising:
- an integration middleware technology component comprising a process executed by a processor, wherein the integration middleware technology component process supports message based integration configured to use a network to identify and configure correlated events, where the correlated events are identified using the network;
- service requests invoked to process business logic and publish the correlated events with the integration middleware technology component, wherein each service request defines a plurality of entities, each entity defines information that facilitates performance of a task by a subsystem of the system that is associated with the entity; and
- wherein the business logic is unique to a specific service provider, and wherein the business logic is executed by one or more instances on the network, and
- wherein the integration middleware technology component is configured to:
  - combine information defined in at least two entities of the plurality of entities to thereby define a correlation ID, and associate the correlation ID with a service request, wherein different service requests are interdependent on one another when their respective correlation IDs match;
  - determine whether interdependencies exist between the one or more instances;
  - communicate service requests associated with a same correlation ID to one or more target subsystems associated with the service requests in a sequential manner so that a single service request of the service requests is processed by an associated target subsystem and finishes processing before a next service request with the same correlation ID is processed by a same or different target subsystem; and
  - communicate service requests associated with different correlation IDs to one or more target subsystems associated with the service requests in parallel to facilitate parallel processing of the service requests by one or more target systems.

* * * * *